July 31, 1962 J. K. JACKSON Re. 25,210

PRECISION PNEUMATIC SPEED SENSING GOVERNOR

Original Filed Nov. 9, 1953 2 Sheets-Sheet 1

JOHN K. JACKSON,
INVENTOR.

BY John H. Wallace

PRECISION PNEUMATIC SPEED SENSING GOVERNOR

Original Filed Nov. 9, 1953 2 Sheets-Sheet 2

JOHN K. JACKSON,
INVENTOR.

BY John H. G. Wallace

United States Patent Office

Re. 25,210
Reissued July 31, 1962

25,210

PRECISION PNEUMATIC SPEED SENSING GOVERNOR

John K. Jackson, Torrance, Calif., assignor to The Garrett Corporation, Los Angeles, Calif., a corporation of California Original No. 2,858,839, dated Nov. 4, 1958, Ser. No. 391,099, Nov. 9, 1953. Application for reissue Oct. 25, 1960, Ser. No. 64,973
26 Claims. (Cl. 137—56)

Matter enclosed in heavy brackets [ ] appears in the original patent but forms no part of this reissue specification; matter printed in italics indicates the additions made by reissue.

This invention relates to speed sensing pneumatic governors which may be used for controlling the speed of turbines, motors, or other machinery having rotating elements.

In the art of centrifugally operated pneumatic governors there are various mechanical arrangements which are well known. Such conventional devices, in order to prevent pneumatic leakage, usually require close tolerances in the machining and assembly of parts thereof. Governors so constructed are expensive, and sometimes close tolerances cause sticking of the parts, particularly when small particles of foreign matter become wedged therebetween. Conventional governors, having a centrifugally responsive or movable member, utilize a spring force to resist centrifugal response thereof. The design of a spring to supply the required force, when operated without means to compensate for additional forces attendant to centrifugal displacement of the movable member, poses certain problems. Those problems involve considerations including spring rate design, together with response time of the governor under certain centrifugal loading of the spring which increases with centrifugal displacement of the movable member as it moves against the spring. Heretofore the solutions of such problems have resulted in the construction of governors in which output signal strength is not proportional to speed changes sensed thereby. Prior devices, when sensing speed changes, have not met the most critical requirement for smooth, uniform operation, low response time and accuracy. Furthermore, previous governors have not been capable of providing sufficient variation in signal strength, during a given speed change, to provide desired performance.

It is an object of the invention to provide a speed sensing pneumatic governor, wherein increased centrifugal force induced by radial displacement of the centrifugally responsive member is compensated for by a fluid pressure differential change on said member occasioned by the operation of a valve connected thereto, whereby the operation of said valve is substantially proportional to the rotative speed of said member.

Another object of the invention is to provide a rotational speed sensing device which is particularly adapted for use in regulating the operation of various machines requiring highly accurate control.

A further object of the invention is to provide an economically produceable speed sensing pneumatic governor having liberal construction tolerances and which is capable of precise speed measurement throughout a certain range.

Still another object of the invention is to provide a speed sensing device wherein a large fluid flow area valve is opened to a considerable degree in proportion to very slightly centrifugal movement thereof whereby changes in signal pressure communicating with the device are substantially proportional to changes in its rotational speed.

Yet another object of the invention is to provide a speed sensing pneumatic governor which responds very rapidly and accurately to minute speed changes.

A further object of the invention is to provide a speed sensing pneumatic governor of this class which causes a relatively great percentage of change in pneumatic signal strength in proportion to a relatively small percentage of speed change.

Another object of the invention is to provide a speed sensing pneumatic governor which causes a decrease in pneumatic signal strength corresponding to a momentary increase in rotational speed whereby failure of pneumatic equipment (in connection with the governor) will result in an overspeed signal tending to reduce speed of a machine with which said governor may be operated.

A further object of the invention is to provide a speed sensing device which is particularly adapted to accurately control the speed of various pneumatically operated machines such as turbines or internal combustion engines.

These and other objects will appear from the following specification and drawings in which.

Figure 1:
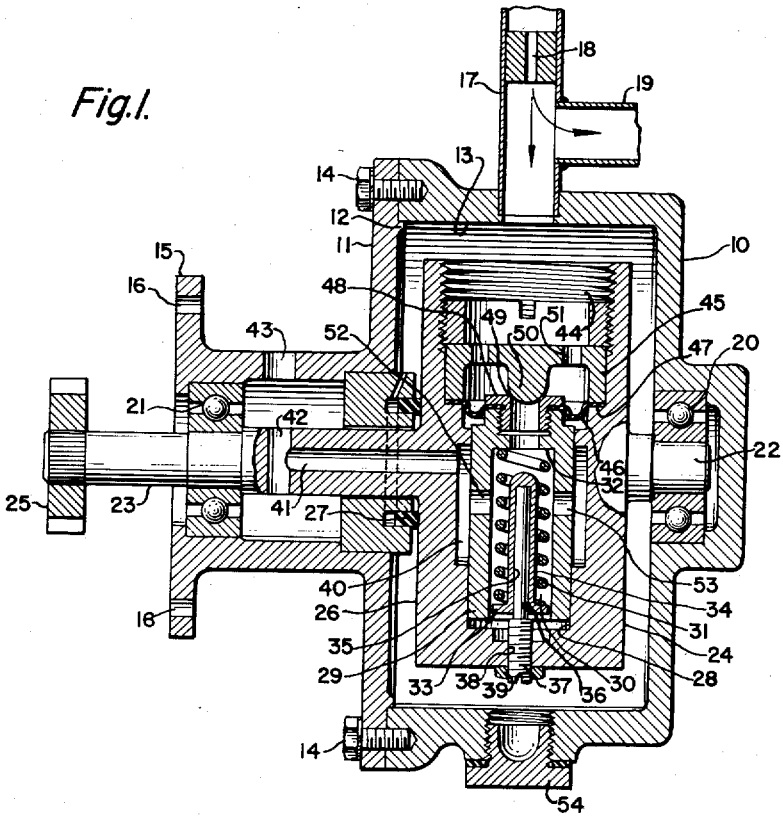
FIG. 1 is an axial sectional view of the speed sensing pneumatic governor according to the present invention showing portions in elevation and fragmentarily to amplify the illustration.
Figure 2:
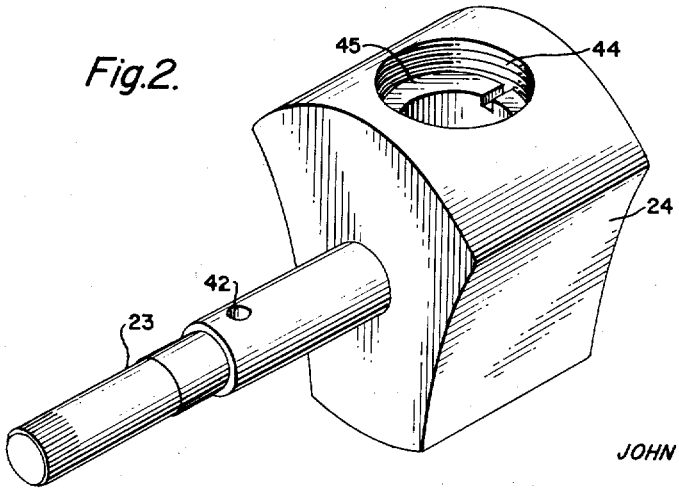
FIG. 2 is a perspective view of the rotor and the rotor shaft of the governor.

A casing 10 having a cover or cap member 11 provides an enclosure for the operating elements of the governor. The cover 11 is maintained in concentric relationship with the casing 10 by means of an annular shoulder 12 which is maintained in engagement with the internal wall 13 of the casing 10 when the cover 11 is securely fixed to the casing 10 by means of bolts 14. The cover 11 is provided with a mounting flange 15 having openings 16 therein which are adapted to receive bolts for connecting the casing 10 to the frame of a machine which the governor may control. Communicating with the interior of the casing 10 is a fluid supply conduit 17 having a restriction 18 therein upstream from the casing 10. Communicating with the interior of the casing 10 downstream from the restriction 18 is a signal pressure conduit 19.

The bearings 20 and 21 are mounted in the casing 10 and cover 11, respectively, and support shaft portions 22 and 23 of a rotor 24 which is rotatably mounted in the casing 10. Fixed to the end of the shaft portion 23 is a gear 25 adapted to mesh with a driving gear of rotating machinery with which the governor is associated. Surrounding the shaft portion 23 and engaging the end surface 26 of the rotor 24 is a carbon seal 27 adapted to prevent gas leakage around the shaft 23 and outwardly of the casing 10. The rotor 24 is a hollow member having a bore 28 therein which is disposed transversely or radially of the shaft 23. Reciprocally mounted in this bore 28 is a centrifugally responsive piston member 29 having a recess 30 in which a spring 31 is positioned. The spring 31 engages a step 32 of the bore 30 which provides an abutment shoulder therefor. The opposite end of the spring 31 engages a flange 33 of a spring guide 34. The guide 34 provides guidance for the interior of the coil spring in order to maintain stable operation thereof. The guide 34 is provided with a central bore 35 in which an extending pin 36 of an adjusting screw 37 is positioned. The adjusting screw 37 is externally screw threaded in a screw threaded opening 38 in the rotor 24. The jam nut 39 is arranged to fix the adjusting screw 37 in a desired position. The bore 28 in the rotor 24 is provided with an enlarged portion 40 which communicates with a vent passage 41 in the shaft 23. This vent passage 41 is provided with a laterally extending passage portion 42 which vents through an opening 43 in the casing cap member 11. The vent opening 43 communicates with the surrounding atmosphere.

Screw threaded in an enlarged bore portion 44 in the rotor is an outer diaphragm retainer 45. This diaphragm retainer clamps the peripheral portion of a diaphragm 46 onto a shelf 47 of the rotor thereby sealing the periphery of the diaphragm 46 to the rotor 24. An inner diaphragm retainer 48 arranged in screw threaded relationship with the end of the piston 29 extends through a central opening in the diaphragm 46 and clamps it in fluid tight relationship with the piston 29 thereby forming a seal between the piston and the rotor. The diaphragm retainer 48 is provided with a valve seat element 49 which cooperates with a poppet valve element 50 of the diaphragm retainer 45. Extending through the outer diaphragm retainer 45 are openings 51 which communicate with the valve elements 49 and 50. The valve elements 49 and 50, in turn, communicate with the enlarged bore portion 40 through vent openings 52 and 53 of the piston member 29 and hence with the vent passage 41 in the shaft 23. A plug 54 is screw threaded into the casing 10 along the axis of the adjusting screw 37 permitting adjustment thereof in order to obtain the desired pre-load of the spring 31 during calibration of the governor.

The governor, when in operation, is connected as hereinbefore described with rotating machinery which drives the gear 25 for revolving the shaft 23 and rotor 24 in the casing 10. Pneumatic fluid or gas under pressure in the conduit 17 passes through the orifice 18 and into the casing 10 and signal pressure conduit 19. Fluid pressure in the casing 10 exerts force on the diaphragm 46 and the piston in the direction of centrifugal response thereof and when the rotational speed of the rotor 24 increases to a predetermined value, centrifugal force together with pneumatic force on the diaphragm 46 forces the piston 29 toward the adjusting screw 37 against the compressive force of the spring 31. Centrifugal movement of the piston 29 causes opening of the valve elements 49 and 50 at which time fluid passes through the piston 29 to the passage 41 which vents to atmosphere. Venting of compressed fluid from the casing 10 to atmosphere causes a pressure drop in the signal pressure conduit 19 which is connected to suitable pneumatic mechanism which provides a control for the motor driving the gear 25.

Attention is called to the fact that during initial opening of the valve elements 49 and 50 fluid pressure from the casing 10 is vented to an area corresponding to the opposite side of the diaphragm 46 changing the pressure differential thereacross, thereby reducing the pressure acting on the piston in the direction of centrifugal movement thereof. Such reduction in the pneumatic force on the piston 29 compensates for additional centrifugal forces on the piston 29 which are imposed by the shifting of its center of gravity in a direction of centrifugal movement. It will therefore be understood that operation of the valve elements 49 and 50 and pressure reduction in the casing 10 are directly proportional to rotational speed of the rotor 24 since additive centrifugal forces attendant to centrifugal movement of the piston 29 are compensated for by a pressure differential change across the diaphragm 46. It will be understood that the tolerance fit of the piston 29 in the bore 28 of the rotor 24 may be very liberal due to the fact that the diaphragm 46 obviates the necessity for pneumatic sealing of the piston in the bore 28. Liberal tolerance fit of the piston 29 in the bore 28 provides a passage for air from one side of the diaphragm 46 to the opposite side [thereby] *thereof*. The use of the diaphragm, and construction of the governor wherein liberal tolerances of the parts may be adhered to, permits the production of such governors at low cost. The centrifugal movement of the piston 29 in the rotor 24 is very slight due to the large area of the valve elements 49 and 50. Therefore, load of the spring

31 when compressed remains fairly constant over the very small range of centrifugal movement of the piston 29. The pressure differential change across the diaphragm 46, when the valve elements 49 and 50 open, quite accurately compensates for the increasing centrifugal force attendant to the slight centrifugal movement of the piston 29.

The following is an analysis of the force balance of the spring, the fluid pressure in the casing 10 acting on the diaphragm 46, and the centrifugal force attendant to a certain rotational speed and movement of the piston 29 about the axis of the shaft 23.

During operation at low speeds the force ($F_s$) imposed by the compression spring (31) acts to hold the orifice closed, and the output fluid pressure $P_o$ is nearly equal to the supply pressure, thus imposing a pneumatic load ($F_a$) upon the diaphragm. As the rotational speed of the rotor increases the centrifugal force ($F_c$) acting upon the piston in the same direction as $F_a$ increases, and at some speed depending upon $P_o$ the orifice 49 and 50 will begin to open. The force balance on the system is then given by:

$$F_c+F_a=F_s \qquad (1)$$

in which $$F_c=\frac{w}{g}r\omega^2=\frac{w}{g}r\left(\frac{2\pi N}{60}\right)^2 \qquad (2)$$

and $$F_a=P_oA_d \qquad (3)$$

in which w is the weight of the piston (lbs.),
g is the acceleration of gravity, 384 in./sec.$^2$,
r is the radius of the center of gravity of the piston from its axis of rotation (inches),
N is the drive speed (r.p.m.),
$P_o$ is the output pressure in p.s.i.g., and
$A_d$ is the diaphragm area.

If the position of the center of gravity of the piston is assumed constant, that is, r is assumed constant with variation of N, $F_s$ is the constant pre-load upon the spring. Equation 1 then becomes:

$$\frac{w}{g}r\left(\frac{2\pi N}{60}\right)^2+P_oA_d=F_s \qquad (4)$$

Substituting $$\frac{w}{g}\frac{r}{A_d}\left(\frac{2\pi}{60}\right)^2=K \text{ (constant)}$$

and solving for the output pressure $P_o$, then $$P_o=\frac{F_s}{A_d}-KN^2 \qquad (5)$$

Therefore the output pressure $P_o$ will be zero if $$N^2=\frac{F_s}{KA_d}$$

and will be related to variations in drive speed by the relation $dP_o=-2KNdN$, both $F_s$ and $A_d$ being constant. Thus the pressure $P_o$ increases as the speed decreases, and the signal pressure is a function only of speed as long as the center of gravity of the piston does not move appreciably.

It will be noted that the governor responds very quickly to a speed change due to the fact that pneumatic pressure on the diaphragm 46 together with centrifugal force moves the piston 29 very rapidly which opens the valve elements 49 and 50 whereupon a pressure change across the diaphragm 46 is very quickly effected which very rapidly moves the valve elements 49 and 50 into a position that directly corresponds with the speed of rotation. The rapid opening of the valve elements 49 and 50 and the ability of the governor to control the large venting area of these valve elements promotes rapidity of response and low amplitude [on] *of* centrifugal displacement of the piston 29. Operation of this governor for venting fluid pressure to atmosphere downstream of the orifice 18 provides a substantially fail-safe arrangement which will create an overspeed signal in the event of spring or diaphragm failure in the governor or in the event of the failure of other elements of the control system which will cause a reduction of pressure downstream from the orifice 18. When such an overspeed signal occurs the control elements communicating with the pressure signal conduit 19 tend to reduce speed of the machine driving the gear 25 on the shaft 23.

Figure 3:
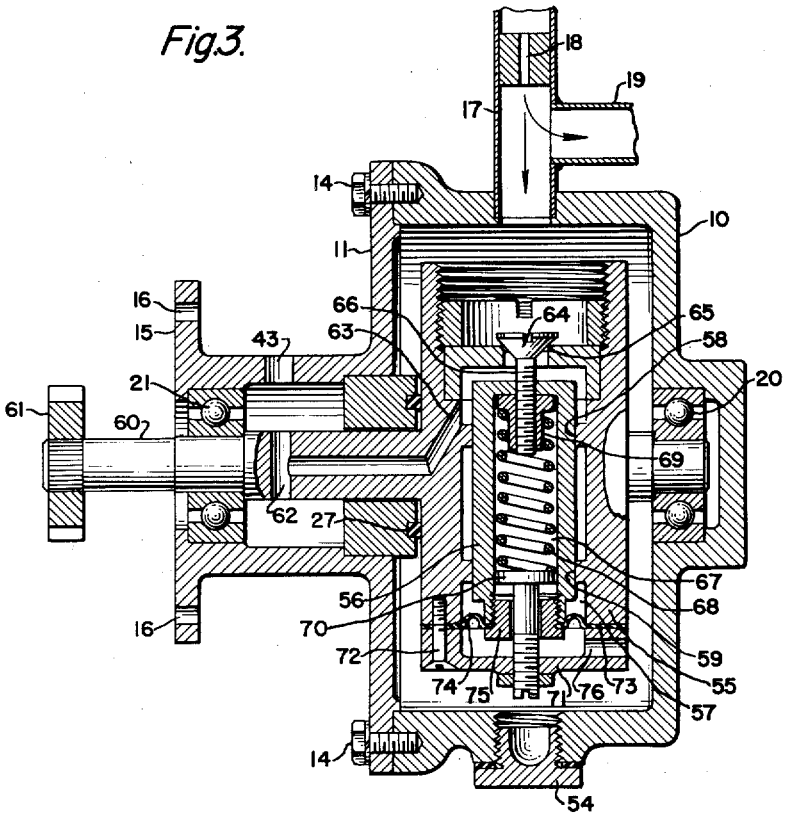
FIG. 3 is a sectional view similar to FIG. 1 showing a modified form of the invention.

In the modified form of the invention as shown in FIG. 3 a normally open valve mechanism is provided to cause the signal pressure to increase as speed increases. The structure of the modified form of the invention as shown in FIG. 3 of the drawings is similar to that shown in FIG. 1 except for details of the rotor 55 and parts connected with and operated by the piston 56. The rotor 55 is provided with a bore 57 having reduced diameter portions 58 and 59 in which the piston 56 is slidably mounted transversely of the axis of the shaft 60 which is driven by the gear 61. The shaft 60 is mounted in a similar manner to the shaft 23 shown in FIG. 1 and is provided with a vent passage 62 similar to the vent passage 41 therein. The inner end 63 of the vent passage 62 communicates with the outer side of the piston 56 near [its] *the* end [with] *in* which [the] *a poppet* valve 64 is [a] *mounted. This* poppet [type] valve *is* arranged to be normally open and adapted to seat on the valve element or seat 65 carried by the rotor 55. The valve 64 is provided with a screw threaded stem 66 arranged in screw threaded adjustable relationship with the piston 56 so that its clearance relative to the valve seat 65 may be adjusted as desired. The piston 56 is provided with a bore 67 therein which contains a spring 68 abutted at its one end to a nut 69 and engaged at its other end by an adjustment screw 70 which is screw threaded in the end cap 71 of the rotor 55. The end cap 71 is fixed to the rotor 55 by means of screws 72 and also retains the peripheral portion 73 of the diaphragm 74. The diaphragm 74 is provided with a central opening in which a nut 75 is positioned. The nut 75 is screw threaded to the piston 56 and clamps and seals the middle portion of the diaphragm 74 thereto. The rotor cap 71 is provided with an opening 76 which communicates with the interior of the casing 10 to permit air pressure therein direct access to the diaphragm 74.

Operation of the modified form of the invention in FIG. 3 is substantially as follows:

When the shaft 60 is rotated by means of the gear 61 and when fluid or air under pressure is transmitted into the casing 10 by means of the tube 17 the normally open condition of the valve 64 permits air to flow through the valve seat 65, passes portions 63 and 62 and outwardly through the vent 43. As speed of the shaft 60 is increased centrifugal force acting on this piston 56 against compression of the spring 68 tends to slowly close the poppet valve 64 toward the seat 65. Consequently venting of air from the casing 10 through the vent 43 is decreased which proportionally increases signal pressure in the signal pressure conduit 19. At the same time, as the speed of the shaft 60 and rotor 55 increases and as the pressure in the casing 10 rises it acts on the diaphragm 74 to compensate for additional centrifugal force attendant to the movement of the center of gravity of the piston 56 away from its rotational axis.

The modified form of the invention as shown in FIG. 3 incorporates the normally open valve which causes an increase in pressure proportional to an increase in speed of the shaft 60 and the rotor 55. This distinction from the operation of the device as shown in FIG. 1 may be advantageous in the operation of certain equipment with which the governor may be connected.

I claim:

1. In a speed responsive pneumatic governor, a stationary casing having a fluid inlet, a rotor in said casing, a centrifugally responsive member movably positioned in said rotor, a valve communicating with said inlet and having a pair of valve elements adapted to be in open or closed position, one of said valve elements being carried by said rotor, the other of said valve elements being carried by said member, a vent communicating with said valve and a region of lower pressure than that at said inlet, a diaphragm responsive to fluid pressure in said casing and interconnecting said rotor and said member in sealed relationship to each other to prevent fluid leakage therebetween, said diaphragm responsive to a differential between fluid pressures in said inlet and said vent and means tending to resist centrifugal response of said member in said rotor and to maintain said valve elements in a predetermined position relative to each other, said valve disposed to change a pressure differential across said diaphragm in response to a speed increase of said rotor, said change in said pressure differential effective in a direction to assist said last mentioned means.

2. In a speed responsive pneumatic governor, a stationary casing having a fluid inlet, a rotor in said casing, a centrifugally responsive member movably positioned in said rotor, a spring tending to resist centrifugal response of said member, means for adjusting the force of said spring, a valve communicating with said inlet and having a pair of valve elements adapted to be in open or closed position, one of said valve elements being carried by said rotor, the other of said valve elements being carried by said member, a vent communicating with said valve and atmosphere, and a diaphragm responsive to fluid pressure in said casing and interconnecting said rotor and said member in sealed relationship to each other to prevent fluid leakage therebetween, said diaphragm responsive to a differential between fluid pressures in said inlet and said vent, said valve disposed to change a pressure differential across said diaphragm in response to a speed increase of said rotor, said change in pressure differential effective in a direction to assist said spring.

3. In a speed responsive pneumatic governor, a stationary casing having a fluid inlet, a rotor in said casing, a centrifugally responsive piston movably positioned in said rotor, a spring tending to resist centrifugal response of said piston, means for adjusting the force of said spring, a poppet valve communicating with said inlet and having a pair of valve elements adapted to be in open or closed position, one of said valve elements being carried by said rotor, the other of said valve elements being carried by said piston, a vent communicating with said valve and atmosphere, and a diaphragm responsive to fluid pressure in said casing and interconnecting said rotor and said piston in sealed relationship to each other to prevent fluid leakage therebetween, said diaphragm responsive to a differential between fluid pressure in said inlet and said vent, said valve disposed to change a pressure differential across said diaphragm in response to a speed increase of said rotor, said change in said pressure differential effective in a direction to assist said spring.

4. In a speed responsive pneumatic governor, a supply conduit for fluid pressure, a restriction in said conduit, a stationary hollow casing having an interior space communicating with said supply conduit downstream from said restriction, a signal pressure conduit communicating with said supply conduit and said casing downstream from said restriction, a rotor in said casing, a centrifugally responsive member movably positioned in said motor, means tending to resist centrifugal response of said member, a valve communicating with the interior of said casing having a pair of valve elements, one of said valve elements being carried by said member, the other of said valve elements being carried by said rotor, a vent communicating with said valve elements and a region of lower pressure than that in said casing, and a diaphragm responsive to fluid pressure in said casing and interconnecting said rotor and said member in sealed relation to each other to prevent fluid leakage therebetween, said diaphragm responsive to a differential between fluid pressures in said inlet and said vent, said valve disposed to change a pressure differential across said diaphragm in response to a speed increase of said rotor, said change in pressure differential effective in a direction to assist said last mentioned means.

5. In a speed responsive pneumatic governor, a supply conduit for fluid pressure, a restriction in said conduit, a stationary hollow casing having an interior space communicating with said supply conduit downstream from said restriction, a signal pressure conduit communicating with said supply conduit and said casing downstream from said restriction, a rotor in said casing, a centrifugally responsive member movably positioned in said rotor, a valve communicating with the interior of said casing having a pair of valve elements, one of said valve elements being carried by said member, the other of said valve elements being carried by said rotor, a vent communicating with said valve elements and ambient atmosphere, a diaphragm responsive to fluid pressure in said casing and interconnecting said rotor and said member in sealed relation to each other to prevent fluid leakage therebetween, said diaphragm responsive to a differential between fluid pressures in said inlet and said vent and means tending to resist centrifugal response of said member in said rotor and to maintain said valve elements substantially in a certain position relative to each other, said valve disposed to change a pressure differential across said diaphragm in response to a speed increase of said rotor, said change in said pressure differential effective in a direction to assist said last mentioned means.

6. In a speed responsive pneumatic governor, a supply conduit for fluid pressure, a restriction in said conduit, a stationary hollow casing having its interior space communicating with said supply conduit downstream from said restriction, a signal pressure conduit communicating with said supply conduit and said casing downstream from said restriction, a rotor in said casing, a centrifugally responsive piston movably positioned in said rotor, a valve communicating with the interior of said casing having a pair of valve elements, one of said valve elements being carried by said piston, the other of said valve elements being carried by said rotor, a vent communicating with said valve elements and ambient atmosphere, a diaphragm responsive to fluid pressure in said casing and interconnecting said rotor and said piston in sealed relation to each other to prevent fluid leakage therebetween, said diaphragm responsive to a differential between fluid pressures in said inlet and said vent and means tending to resist centrifugal response of said piston in said rotor and to maintain said valve elements in certain position relative to each other, said valve disposed to change a pressure differential across said diaphragm in response to a speed increase of said rotor, said change in said pressure differential effective in a direction to assist said last mentioned means.

7. In a speed responsive pneumatic governor, a supply conduit for fluid pressure, a restriction in said conduit, a stationary hollow casing having its interior space communicating with said supply conduit downstream from said restriction, a signal pressure conduit communicating with said supply conduit and said casing downstream from said restriction, a rotor in said casing, a centrifugally responsive member in said rotor having a fluid passage extending therethrough, means tending to resist centrifugal response of said member, a valve operable by movement of said member with respect to said rotor to control flow through said passage, said valve communicating with said passage and said interior space, said rotor having a shaft provided with a vent passage therein communicating with said fluid passage in said member, said valve communicating *through said passages* with a region of lower pressure than that in said casing, whereby said casing may be vented through said valve to said region depending upon the rotational speed of said rotor and the centrifugal displacement of said member, said valve *being* disposed to change a pressure differential across said centrifugally responsive member, said change in pressure differential *being* effective in a direction to assist said last mentioned means.

8. In a speed responsive pneumatic governor, a supply conduit for fluid pressure, a restriction in said conduit, a stationary hollow casing having its interior space communicating with said supply conduit downstream from said restriction, a signal pressure conduit communicating with said supply conduit and said casing downstream from said restriction, a rotor in said casing, a centrifugally responsive member in said rotor having an air passage extending therethrough, a spring tending to resist centrifugal response of said member, a valve operable by movement of said member with respect to said rotor to control flow through said passage, said valve communicating with said passage and said interior space, said rotor having a shaft provided with a vent passage therein communicating with the internal passage in said member, said valve communicating *through said passages* with atmosphere, whereby said casing may be vented through said valve to atmosphere depending upon the rotational speed of said rotor and the centrifugal displacement of said member, said valve *being* disposed to change a pressure differential across said centrifugally responsive member, said change in pressure differential *being* effective in a direction to assist said *spring* [last mentioned means].

9. In a speed responsive governor, a supply conduit for fluid pressure, a restriction in said conduit, a stationary hollow casing having its interior space communicating with said supply pressure conduit downstream from said restriction, a signal pressure conduit communicating with said supply conduit and said casing downstream from said restriction, a rotor in said casing, a centrifugally responsive member in said rotor having a fluid passage extending therethrough, a valve element carried by said member and operable by centrifugal movement of said member with respect to another valve element carried by said rotor and disposed to control flow through said passage, said rotor having a shaft extending outwardly of said casing whereby it is capable of being rotated from without the casing, said shaft provided with a vent passage therein communicating with the fluid passage in said member, said member intercommunicating with said interior space and said vent passage, said vent passage communicating with a reservoir at low pressure, whereby said casing may be vented through said valve elements to said reservoir depending upon the rotational speed of said rotor and the centrifugal displacement of said member.

10. In a speed responsive pneumatic governor, a supply conduit for fluid pressure, a restriction in said conduit, a stationary hollow casing having its interior space communicating with said supply conduit downstream from said restriction, a signal pressure conduit communicating with said supply conduit and said casing downstream from said restriction, a rotor in said casing having vent passage means communicating with a region of a different lower pressure than that in said casing, a centrifugally responsive member having a pressure responsive element communicating with fluid pressure in said casing and positioned in said rotor, a valve intercommunicating with said vent passage and the interior of said casing, said valve operable by said member during centrifugal response thereof, to change the pressure differential across said element for operating said valve and to thereby control flow of fluid through said casing, and through said vent passage means, to said region of lower pressure, said pressure responsive element disposed to sense a differential between fluid pressures in said interior space and said vent passage means, means tending to resist centrifugal response of said member, said pressure responsive element being arranged with respect to said last mentioned means so that changes in the differential pressure, caused by operation of said valve, increases the effectiveness of said last mentioned means to assist said last mentioned means whereby to substantially compensate for the increased centrifugal force attendant to the travel of said member away from its axis of rotation.

11. In a speed responsive pneumatic governor, a supply conduit for fluid pressure, a restriction in said conduit, a stationary hollow casing having its interior space communicating with said supply conduit downstream from said restriction, a signal pressure conduit communicating with said supply conduit and said casing downstream from said restriction, a rotor in said casing having vent passage means communicating with atmosphere, a centrifugally movable member *disposed* in said rotor *to sense the pressure differential between said casing and atmosphere,* a valve carried by said rotor and intercommunicating with said vent passage and the interior of said casing, said valve *being* operable by said member during centrifugal movement thereof to control flow of fluid from said casing through said vent passage means to atmosphere, resilient means in said rotor tending to resist centrifugal movement of said member, *the* fluid pressure *differential between* [in] said casing *and atmosphere* tending to assist said member to move in a direction of centrifugal movement, whereby said valve when operated causes a change in *said* fluid pressure *differential* acting on said member and effective in a direction to compensate for the increased centrifugal forces attendant to the travel of said member away from its axis of rotation.

12. In a speed responsive pneumatic governor, a supply conduit for fluid pressure, a restriction in said conduit, a stationary hollow casing having an interior space communicating with said supply conduit downstream from said restriction, a signal pressure conduit communicating with said supply conduit and said casing downstream from said restriction, a rotor in said casing having vent passage means communicating with atmosphere, a centrifugally movable piston *disposed* in said rotor *to sense the pressure differential between said casing and atmosphere,* a valve carried by said rotor and intercommunicating with said vent passage and the interior of said casing, said valve *being* operable by said piston during centrifugal response thereof to control flow of air from said casing through said vent passage means to atmosphere, resilient means in said rotor tending to resist centrifugal movement of said piston, said piston member being responsive to *the* fluid pressure [in] *differential between* said casing *and atmosphere* [which tends] to assist it to move centrifugally, whereby said valve when operated causes a change in [a] *said* fluid pressure differential, acting on said piston, said change *being* effective in a direction to compensate for the increased centrifugal force attendant to the travel of said piston away from its axis of rotation.

13. In a speed responsive pneumatic governor, a conduit, a stationary hollow casing having its interior space communicating with said conduit, a rotor in said casing having passage means communicating with a region of lower pressure than that in said casing, a centrifugally responsive member having a pressure responsive element positioned in said rotor and sensing a fluid pressure differential in said casing, a valve, carried by said rotor and intercommunicating with said vent passage and the interior of said casing, said valve operable by said member during centrifugal response thereof, to change the pressure differential across said element and to control flow of fluid through said casing and said passage means, said pressure responsive element disposed to sense a differential between fluid pressures in said interior space and said first mentioned passage means, means tending to resist centrifugal response of said member, whereby said valve when operated causes a change in said pressure differential across said element in a direction to substantially compensate for the increased centrifugal force attendant to the travel of said member away from its axis of rotation.

14. In a speed responsive pneumatic governor, a stationary casing having a fluid inlet, a rotor in said casing, a centrifugally responsive member movably positioned in said rotor, a valve having a pair of normally open valve elements adapted to be in open or closed position, one of said valve elements being carried by said rotor, the other of said valve elements being carried by said member, said valve communicating with said inlet, a vent communicating with said valve and a region of lower pressure than that of said inlet, a diaphragm responsive to fluid pressure in said casing and interconnecting said rotor and said member in sealed relationship to each other to prevent fluid leakage therebetween, said diaphragm disposed to sense a differential between fluid pressures in said inlet and said vent, and means tending to resist centrifugal response of said member in said rotor and to maintain said valve elements in a certain position relative to each other.

15. In a speed responsive pneumatic governor, a stationary casing having a fluid inlet, a rotor in said casing, a centrifugally responsive member movably positioned in said rotor, a valve operable by said member when it responds to centrifugal force and having a pair of normally closed valve elements adapted to be in open or closed position, one of said valve elements being carried by said rotor, the other of said value elements being carried by said member, said valve communicating with said inlet, a vent communicating with said valve and a region of lower pressure than that of said inlet, a diaphragm responsive to fluid pressure in said casing and interconnecting said rotor and said member in sealed relationship to each other to prevent fluid leakage therebetween, said diaphragm disposed to sense a differential between fluid pressures in said inlet and said vent, and means tending to resist centrifugal response of said member in said rotor and to maintain said valve elements in a certain position relative to each other.

16. In a speed responsive pneumatic governor, a supply conduit for fluid pressure, a restriction in said conduit, a stationary hollow casing having its interior space communicating with said supply conduit downstream from said restriction, a signal pressure conduit communicating with said supply conduit and said casing downstream from said restriction, a rotor in said casing, a centrifugally responsive piston movably positioned in said rotor, a normally open valve having a pair of valve elements, one of said valve elements being carried by said piston, the other of said valve elements being carried by said rotor, said valve communicating with said interior space, a vent communicating with said valve elements and ambient atmosphere, a diaphragm responsive to fluid pressure in said casing and interconnecting said rotor and said piston in sealed relation to each other to prevent fluid leakage therebetween, said diaphragm disposed to sense a differential between fluid pressures in said inlet and said vent, and means tending to resist centrifugal response of said piston in said rotor and to maintain said valve elements in an open position relative to each other.

17. In a speed responsive pneumatic governor, a supply conduit for fluid pressure, a restriction in said conduit, a stationary hollow casing having its interior space communicating with said supply conduit downstream from said restriction, a signal pressure conduit communicating with said supply conduit and said casing downstream from said restriction, a rotor in said casing, a centrifugally responsive piston movably positioned in said rotor, a normally closed valve having a pair of valve elements, one of said valve elements being carried by said piston, the other of said valve elements being carried by said rotor, said valve communicating with said interior space, a vent communicating with said valve elements and ambient atmosphere, a diaphragm responsive to fluid pressure in said casing and interconnecting said rotor and said piston in sealed relation to each other to prevent fluid leakage therebetween, said diaphragm disposed to sense a differential between fluid pressures in said inlet and said vent, and means tending to resist centrifugal response of said piston in said rotor and to maintain said valve elements in a closed position relative to each other.

18. A speed responsive governor comprising a stationary casing having a fluid inlet, a rotatable element in said casing, a centrifugally responsive member movably positioned in said rotatable element, a valve associated with said member and with said rotatable element and having a valve element movable relative to a valve element carried by said rotatable element and in unison with said member, said valve communicating with said inlet, a vent communicating with said valve and with a region having a pressure different from that of said inlet, a diaphragm responsive to the pressure difference between said inlet and said region and interconnecting and sealing said member and rotatable element, said diaphragm disposed to sense a differential between fluid pressures in said inlet and said vent and means tending to resist movement of said member due to rotation of said rotatable element and to maintain said valve substantially in a predetermined position.

19. In a speed responsive pneumatic governor, a stationary casing having a fluid inlet, a rotor in said casing, a centrifugally responsive member movably positioned in said rotor, a spring tending to resist centrifugal response of said member, means for adjusting the force of said spring, a valve communicating with said inlet and having a pair of valve elements adapted to be in open or closed position, one of said valve elements being carried by said rotor, the other of said valve elements being carried by said member, a vent communicating with said valve and atmosphere, and movable wall means responsive to a differential between fluid pressure in said casing and said inlet, said movable wall interconnecting said rotor and said member in sealed relationship to each other to prevent fluid leakage therebetween.

20. In a speed responsive pneumatic governor, a stationary casing having a fluid inlet, a rotor in said casing, a centrifugally responsive member movably positioned in said rotor, a spring tending to resist centrifugal response of said member, a valve having a pair of valve elements adapted to be in open or closed position, one of said valve elements being carried by said rotor, the other of said valve elements being carried by said member, said valve communicating with said inlet, a vent communicating with said valve and atmosphere, and movable wall means responsive to fluid pressure in said casing and interconnecting said rotor and said member in sealed relationship to each other to prevent fluid leakage therebetween, said movable wall responsive to a fluid pressure differential between said inlet and said vent, said centrifugally responsive member adapted to move centrifugally with an increase in rotor speed and to operate said valve and thereby change a pressure differential on said movable wall means whereby said change is effective in a direction tending to resist centrifugal movement of said centrifugally responsive member.

21. In a speed responsive pneumatic governor, a conduit, a stationary hollow casing having its interior space communicating with said conduit, a rotor in said casing having passage means communicating with a region of lower pressure than that in said casing, a centrifugally responsive member having a pressure responsive element in said rotor and subjected to a fluid pressure differential between said casing and said region of lower pressure, a valve intercommunicating with said interior space and said region of lower pressure and operable by said member during centrifugal response thereof to change the pressure differential across said element and to control flow of fluid through said casing and said passage means, means tending to resist centrifugal response of said member, whereby said valve when operated causes a change in said pressure differential across said element in a direction to assist said last mentioned means and to substantially compensate for the increased centrifugal force attendant to the travel of said member away from its axis of rotation.

*22. In a speed responsive pneumatic governor: a rotor having an inlet for fluid under pressure; a centrifugally responsive member movably positioned in said rotor; spring means tending to resist centrifugal response of said member; means for adjusting the force of said spring means; a valve communicating with said inlet and having a pair of valve elements adapted to be in open or closed position, one of said valve elements being carried by said rotor, the other of said valve elements being carried by said member; a vent communicating with said valve and atmosphere; and movable wall means responsive to a differential between the fluid pressure in said inlet and the pressure in said vent, said movable wall interconnecting said rotor and said member in sealed relationship to each other to prevent fluid leakage therebetween.*

*23. In a speed responsive pneumatic governor: a rotor having an inlet for fluid under pressure; a movable member positioned in said rotor and arranged to be moved in response to centrifugal force; a spring tending to resist movement of said movable member; means for adjusting the force of said spring; a valve communicating with said inlet and having a pair of valve elements adapted to be in open or closed position, one of said valve elements being carried by said rotor, the other of said valve elements being carried by said member; a vent communicating with said valve and the atmosphere; and a diaphragm interconnecting said rotor and said movable member in sealed relationship to each other to prevent fluid leakage therebetween, said diaphragm being responsive to a differential between the fluid pressure in said inlet and said vent, said valve being disposed to change the pressure differential across said diaphragm in response to a speed increase of said rotor.*

*24. In a speed responsive governor: a rotor having a fluid inlet passage and a vent passage therein communicating with the atmosphere; a movable member disposed in said rotor to sense the pressure differential between said fluid inlet and atmosphere, said member being adapted to be moved in response to centrifugal force; a valve carried by said rotor and intercommunicating with said vent passage and said fluid inlet, said valve being operable by said movable member to control the flow of fluid from said inlet through said vent passage to the atmosphere; and resilient means tending to resist movement of said member, said fluid pressure differential tending to assist said member to move in a direction to open said valve, whereby said valve when operated causes a change in said fluid pressure differential acting on said member and effective in a direction to compensate for the increased forces attendant to the travel of said member in a valve opening direction.*

*25. A speed responsive pneumatic governor comprising: a rotor which is adapted to be rotated on an axis common to a shaft the speed of which is to be governed, said rotor having a fluid inlet passage and a vent passage; a movable member in said rotor adapted to be moved in response to centrifugal force; a valve communicating with said fluid inlet passage and said vent and having a pair of valve elements adapted to be in open or closed position, one of said valve elements being carried by said rotor and the other by said movable member; and a diaphragm responsive to a fluid pressure differential between said inlet passage and said vent and interconnecting said rotor and said movable member.*

*26. In a pneumatic speed control for an engine having a rotatable shaft, the combination comprising: a rotor which is adapted to be rotated by said rotatable shaft, said rotor having fluid inlet and outlet passages; a movable member in said rotor adapted to be moved in response to centrifugal force; a valve communicating with said fluid inlet and outlet passages and having a pair of valve elements adapted to alternate between open and closed*

*positions, one of said valve elements being carried by said rotor and the other by said movable member; and a diaphragm interconnecting said rotor and said movable member and responsive to a fluid pressure differential between said inlet and outlet passages.*

References Cited in the file of this patent or the original patent

UNITED STATES PATENTS 2,155,247 Warner ---------- Apr. 18, 1939